US007533314B2

(12) United States Patent
Troelsen et al.

(10) Patent No.: US 7,533,314 B2
(45) Date of Patent: May 12, 2009

(54) UNIT TEST EXTENDER

(75) Inventors: Henning I. Troelsen, Copenhagen (DK); Ulrich Freiberg, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 11/463,663

(22) Filed: Aug. 10, 2006

(65) Prior Publication Data

US 2008/0052587 A1 Feb. 28, 2008

(51) Int. Cl.
  *G01R 31/28* (2006.01)
  *G06F 11/00* (2006.01)
(52) U.S. Cl. ............... 714/724; 714/736; 714/33
(58) Field of Classification Search .......... None
  See application file for complete search history.

(56) References Cited

U.S. PATENT DOCUMENTS

| | | | |
|---|---|---|---|
| 5,629,878 | A | 5/1997 | Kobrosly |
| 5,673,387 | A | 9/1997 | Chen et al. |
| 6,279,120 | B1 * | 8/2001 | Lautenbach-Lampe et al. ... 714/15 |
| 6,385,741 | B1 | 5/2002 | Nakamura |
| 6,401,220 | B1 | 6/2002 | Grey et al. |
| 6,415,396 | B1 | 7/2002 | Singh et al. |
| 6,502,235 | B1 | 12/2002 | Tosaka et al. |
| 6,523,169 | B1 | 2/2003 | Glunz |
| 6,631,344 | B1 | 10/2003 | Kapur et al. |
| 6,697,525 | B1 * | 2/2004 | Sadeh ............ 382/232 |
| 6,769,114 | B2 | 7/2004 | Leung |
| 6,804,796 | B2 | 10/2004 | Gustavsson et al. |
| 2005/0204201 | A1 | 9/2005 | Meenakshisundaram et al. |
| 2006/0069951 | A1 | 3/2006 | Arnold et al. |
| 2007/0067256 | A1 * | 3/2007 | Zayas et al. ............ 707/1 |

OTHER PUBLICATIONS

Memon et al., A.M., "Regression Testing of GUIs", Proceedings of the 9th European software engineering conference held jointly with 11th ACM SIGSOFT international symposium on Foundations of software engineering, pp. 118-127, Sep. 2003.
Harrold, M. J., "Testing: A Roadmap", International Conference on Software Engineering, Proceedings of the Conference on The Future of Software Engineering, pp. 61-72, Jun. 2000.
Harrold et al, M. J., "An Approach To Analyzing and Testing Component-Based Systems", International Conference on Software Engineering Workshop on Testing distributed Component-Based Systems, pp. 1-7, May 1999.
"Welcome to JSystem", http://aquasw.com/jsystem/last/, pp. 1-2, at least by Apr. 26, 2006.

* cited by examiner

*Primary Examiner*—Christine T Tu
(74) *Attorney, Agent, or Firm*—John D. Veldhuis-Kroeze; Westman, Champlin & Kelly, P.A.

(57) ABSTRACT

A unit test extending system and method use a unit test extender engine and a test pattern to extend a unit test written to validate code under test. The unit test has a first function configured to return a single hard coded value to the code under test. A test pattern database stores test patterns for different hard coded value data types. The unit test extender engine identifies a data type of the hard coded value of the first function in the unit test and retrieves one of the test patterns from the test pattern database. The engine then automatically calls the first function in the unit test a plurality of times, each time returning a different one of a plurality of different values in the retrieved test pattern in order to automatically extend the unit test.

20 Claims, 5 Drawing Sheets

UNIT TEST EXTENDER

BACKGROUND

In computer programming, a procedure or test program commonly referred to as a "unit test" is often used to validate that a particular method is working properly. The method is typically a module of source code. A unit test includes test cases for functions and methods which allow a developer to analyze how the method handles different scenarios. Whenever a developer wants to test a method, the developer can write a unit test to do so.

A unit test handles, for example, "sunshine scenarios" where all inputs and return values provided to the method are as expected. The unit test also handles some exceptions, where the inputs or return values are not as expected, to insure that the method will handle those scenarios properly. Thus, the unit test can be a valuable tool in the validation of software under development.

Making the unit test of a method usually means repeating similar tests with different values. This is done to ensure that the method works as intended with boundary values and handles error situations gracefully. However, this typically requires that the developer who creates the unit test will write numerous embodiments of similar code to handle the various scenarios. Preparation of a unit test can be very time consuming. Even with copying of code, repeating the effort numerous times to handle the various scenarios adds to the time consuming nature of the task. Further, keeping the numerous embodiments of the similar code updated is often an even more tedious and time consuming task.

Developers also have to ensure that the relevant pattern is fully tested. Since the pattern is repeated throughout the tests, this can be hard to recognize. This can be due to the fact that the knowledge for the pattern is scattered throughout the different embodiments of the unit test code.

The discussion above is merely provided for general background information and is not intended to be used as an aid in determining the scope of the claimed subject matter.

SUMMARY

A unit test extending system and method use a unit test extender engine and a test pattern to extend a unit test written to validate code under test. The unit test has a function configured to return a hard coded value to the code under test to aid in the validation of that code. A test pattern database stores test patterns for different hard coded value data types. The unit test extender engine identifies a data type of the hard coded value of the function in the unit test and retrieves one of the test patterns from the test pattern database. The engine then automatically calls the function in the unit test a plurality of times, each time returning a different one of a plurality of different values in the retrieved test pattern in order to automatically extend the unit test. In exemplary embodiments, the test patterns can be used with any method having a hard coded value of a corresponding type. This aids in reducing the redundant work required of the developer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2-1 is an illustration of an example unit test method or function.

FIG. 2-2 is an illustration of the example unit test method or function shown in FIG. 2-1 with unit test extending class wrapping in accordance with some embodiments.

FIG. 4-1 is a flow diagram illustrating an example method embodiment.

FIG. 4-2 is a flow diagram illustrating additional steps of an example method embodiment.

DETAILED DESCRIPTION

Disclosed embodiments include unit test extending systems and methods which can be used to extend unit tests, allowing developers to create unit tests for validating code, while potentially reducing repeated unit test programming, unit test development time, etc. In some exemplary embodiments, the disclosed unit test extender concepts combine a developer unit test with selected test patterns to automatically generate and/or execute test projects. Using these disclosed concepts, hard coded test values are identified, and a matching test pattern is applied, with as little impact as possible in the developer unit test.

In some embodiments, the developer of the code under test should only need to write one test. The unit test extender concepts can then be used to recognize the pattern for this unit test, and to automatically execute/call the original unit test a number of times with all identified "magic" values for the identified test pattern. In exemplary embodiments, the original developer unit test isn't changed at all, and the amount of "instrumentation" is minimal.

Figure 1:
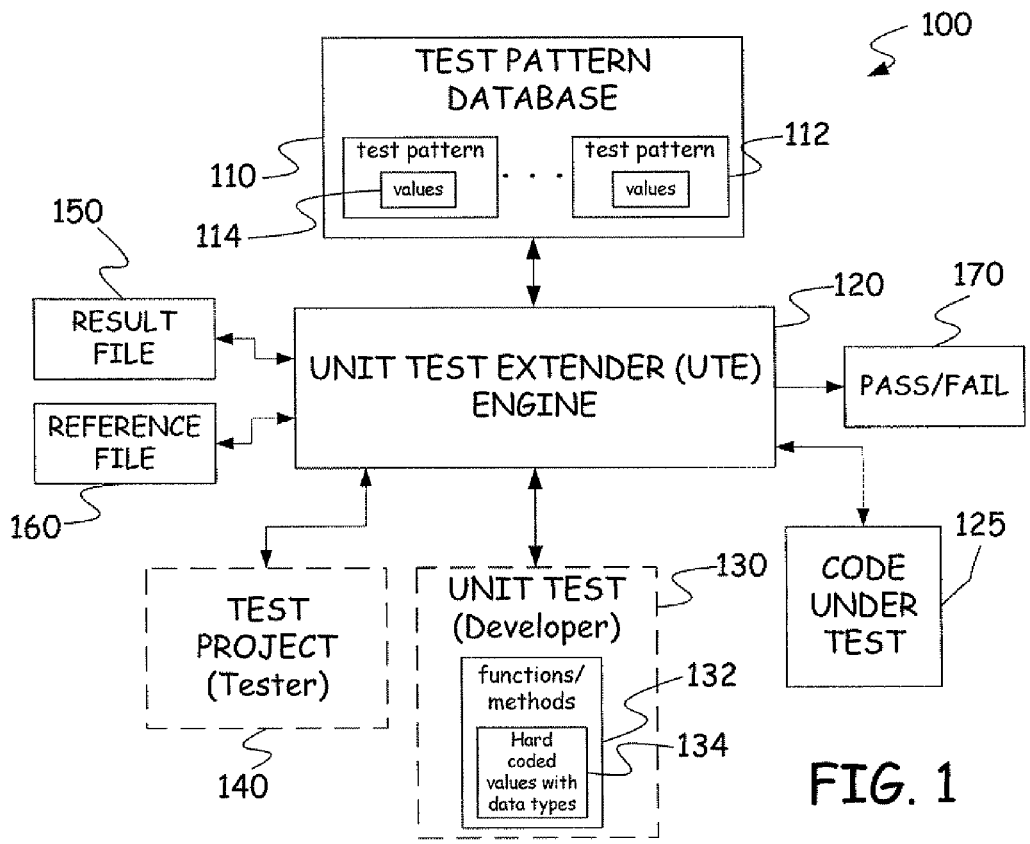
FIG. 1 is a block diagram illustrating one example of a unit test extending system embodiment.

Referring now to FIG. 1, shown is an embodiment of a unit test extending system 100 for use with a unit test 130 written to validate code under test 125. The unit test 130 is typically written by the developer of code under test 125. System 100 is a non-limiting example of disclosed concepts, but those of skill in the art will recognize that other embodiments can also be used to implement the disclosed concepts. Using system 100, as well as methods described below, the efforts required of the developer to create a unit test which ensures that the code 125 will function properly under a wide range of boundary conditions is reduced significantly. Generally, the developer can write unit test 130 to include functions or methods 132 using "sunshine" scenarios which return a hard coded value 134 as would be expected by code under test 125.

A test pattern database 110 stores test patterns 112 for different hard coded value data types. Examples of hard coded value data types for which test patterns 112 can be created include, but are not limited to, integer data types (e.g., Int32 data types), string data types (e.g., Null, Empty, Unicode, very long, etc.), XML string data types, XML file data types, user context data types (e.g., Administrator, Anonymous User, etc.), file data types (e.g., corrupted, read-only, busy, missing, zero-length, etc.), Datetime data types, network data types (e.g., valid or invalid network address), etc.

Each test pattern 112 for a particular data type includes a pattern of multiple values of that data type. Typically, the pattern of multiple values include values at boundary conditions where programmers typically experience problems. These values are sometimes referred to as "magic" values. For example, for the Int32 test pattern, boundary values of MAX, MIN, 0, MAX−1, MIN+1, and error situations (variables not instantiated) can be included in the test pattern.

A unit test extender (UTE) engine 120 of system 100 is configured to identify a data type (e.g., data type 216 shown in FIG. 2-2 and described later) of hard coded values 134 of functions 132 in the unit test. Engine 120 then retrieves the appropriate test pattern 112 from the test pattern database 110 based on the identified hard coded value data type. Using the retrieved test pattern, engine 120 then automatically calls the function 132 in the unit test 130 multiple times. During each iteration of calling the function 132, engine 120 returns a different one of the test pattern values 114 to code under test 125 in order to automatically extend the unit test 130. This allows the function 132 to be used to test the code under test 125 for responses to the test pattern values 114, without requiring (or reducing the requirement for) repeated similar unit test programming steps by the developer, and without relying on (or reducing the reliance on) automatic code generation techniques.

In some example embodiments, when writing a test project 140 for testing code 125, a tester includes in the test project a reference to the developer's unit test 130 and a reference to the extended test pattern 112 to be used in extending the unit test. This reference to the test pattern can be explicitly set by the test project, or can be automatically determined based on determined data types of hard coded values 134 as discussed above. The tester then runs the test for the first time, storing the results (e.g., how the code 125 handled the various returned values) in a results log or file 150 (e.g., as result.xml). This execution log 150 is then validated as being the expected results for the code 125. The execution log 150 is then saved as a reference file or log 160 (e.g., reference.xml) which is included in the test project for future use. The test project can then be used at various stages of code development. At any given stage, the results of the test are stored in result file or log 150 by engine 120. Engine 120 then compares results file or log 150 to reference file or log 160 to generate a pass/fail indication 170 (e.g., in the form of a displayed, printed or other forms of report). If there is a match between the two files 150 and 160, a pass indication is generated. If there is not a match, a fail indication is generated, indicating a potential problem with code 125 and/or its interaction with other modules, code segments, etc.

Figures 1, 2:
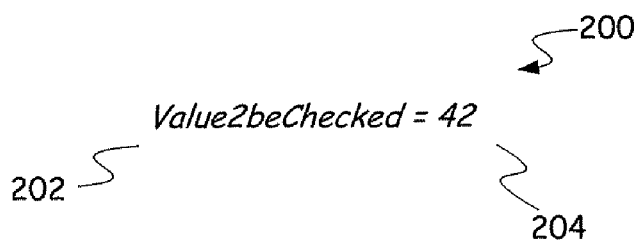
Figure 2:
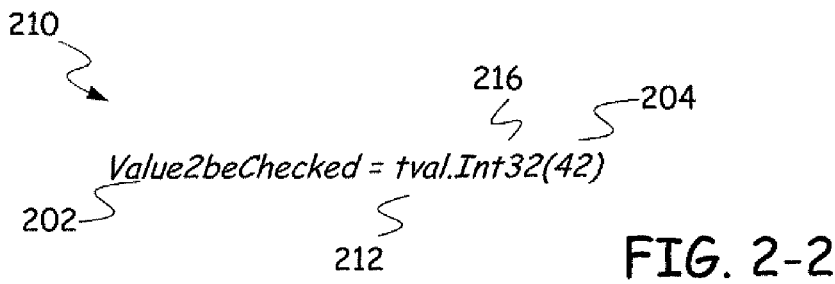

Referring now to FIGS. 2-1 and 2-2, shown are example embodiments of how the unit test extender methods can be implemented with a low amount of developer effort required. In one example embodiment, a developer creates a new method/function in code 125, and a unit test 130 to validate that the method works as intended. The developer can, in some embodiments, identify candidates for extension using engine 120 and corresponding test patterns 112. He or she can then apply test pattern wrapping. For the developer's part, this wrapping is an identical mapping (e.g., whatever hard coded value is put into the unit test is gotten back during use of the unit test).

In some disclosed embodiments, a method or function (e.g., 132 in FIG. 1) to be extended is wrapped in a unit test extending class. An example of this wrapping in a unit test extending class is provided in FIG. 2-2. Referring first however to FIG. 2-1, an example of a line of code 200 representing a method or function without the test pattern extending concepts is provided. The method includes a variable "Value2beChecked" 202, as well as a hard coded value 204 to be returned. In an example embodiment, to facilitate the unit test extender concepts disclosed herein, the developer writes a similar line of code 210 representing the method or function, but wrapping the function in a unit test extending class 212. In an example embodiment, it is the hard coded value 204 which is wrapped in the unit test extending class 212. When wrapped in the unit test extending class 212 as shown in FIG. 2-2, the function now specifies the single hard coded value 204, and the data type 216 of the single hard coded value. The unit test extender engine 120 can then use this data type information to retrieve the appropriate test pattern from database 110. In alternate embodiments, the unit test extender engine 120 is configured to automatically identify hard coded values in the unit test, and to wrap corresponding functions in the unit test in the unit test extending class 212. In these alternate embodiments, the developer does not need to alter his or her code to implement the wrapping.

Figure 3:
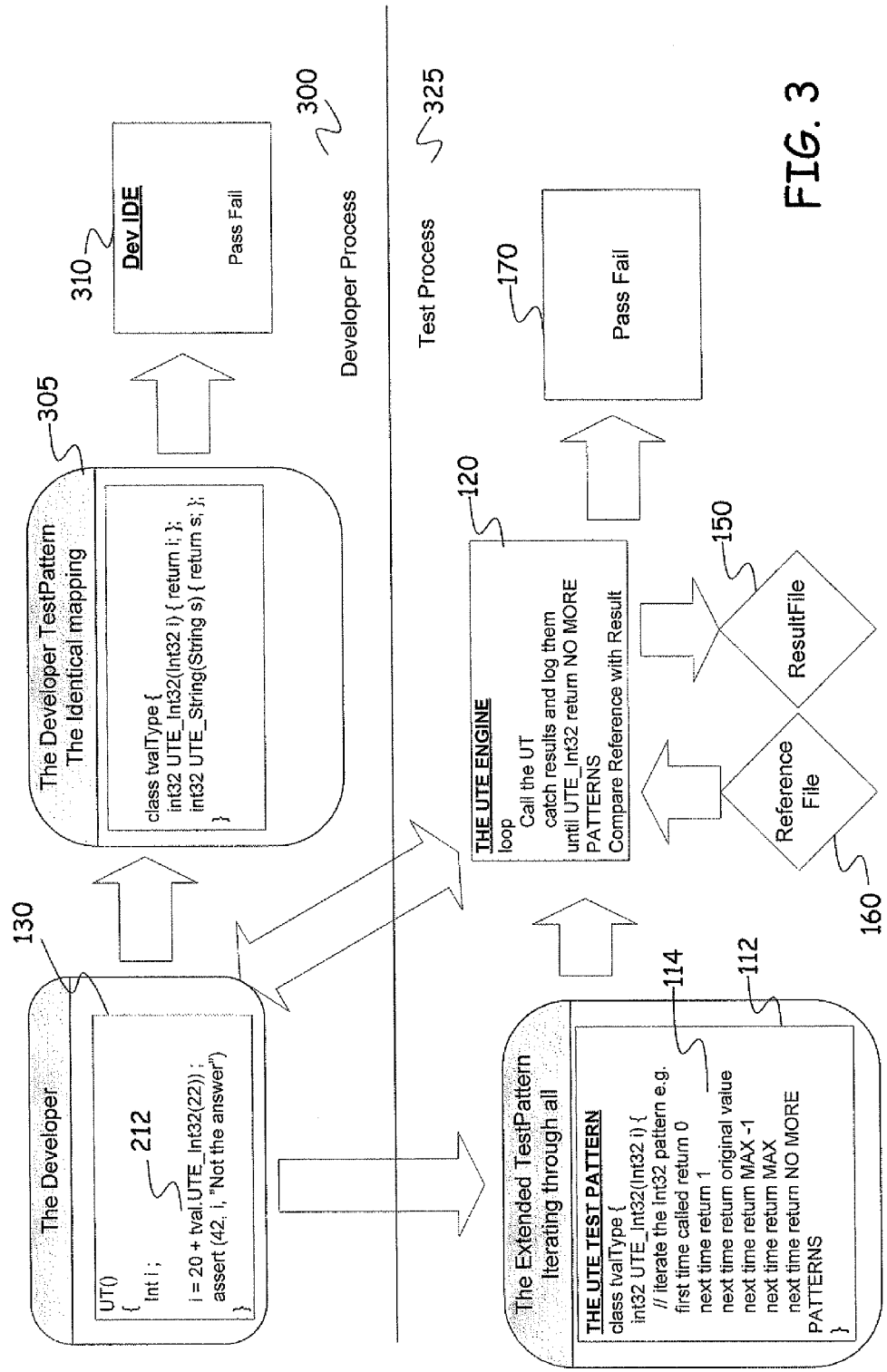
FIG. 3 is an illustration of some disclosed unit test extending concepts.

Referring now to FIG. 3, shown is an example illustration of the disclosed unit test extending concepts used to extend a unit test. In this example, consider the case where a unit test 130 is created to validate an "Add" function "20+22", with the hard coded return value of "42". An "Int32" test pattern is applied (using unit test extending class 212) and a test is generated to address boundary values (MAX, MIN), magic numbers (0, MAX−1, MIN+1), and error situations (variables not instantiated). This test utilizes the appropriate extended test pattern 112. When executed in the developer environment or process 300, the developers test pattern is used and an identical mapping to the hard coded value is implemented in returning values to the code under test. This is illustrated at 305 in developer process 300 in FIG. 3. A pass or fail indication 310 is provided as is typical for the single hard coded value in the development process.

However, in the test process 325 using a test project as described above, the unit test extender engine 120 calls the unit test 130 iteratively, returning different ones of the values 114 in the test pattern during each iteration, until a NO MORE PATTERNS value is found. The results file 150 is compared to the reference file 160 as described above, and based on the comparison the pass/fail indication of the extended test is provided.

Figures 1, 4:
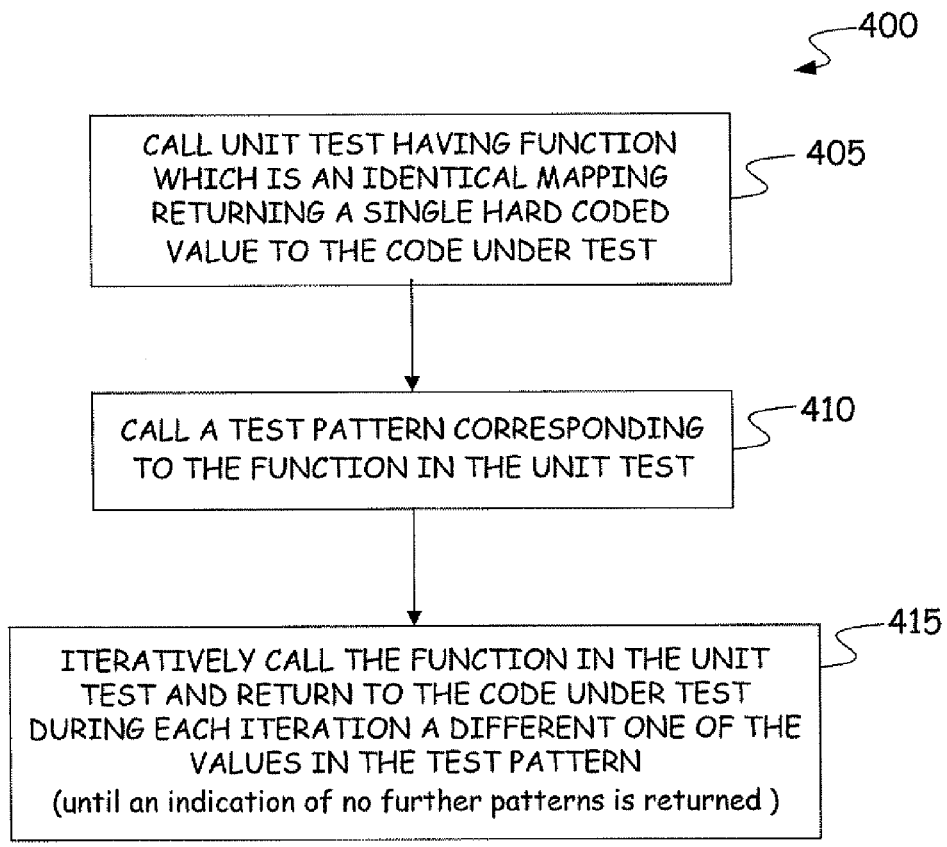
Figures 2, 4:
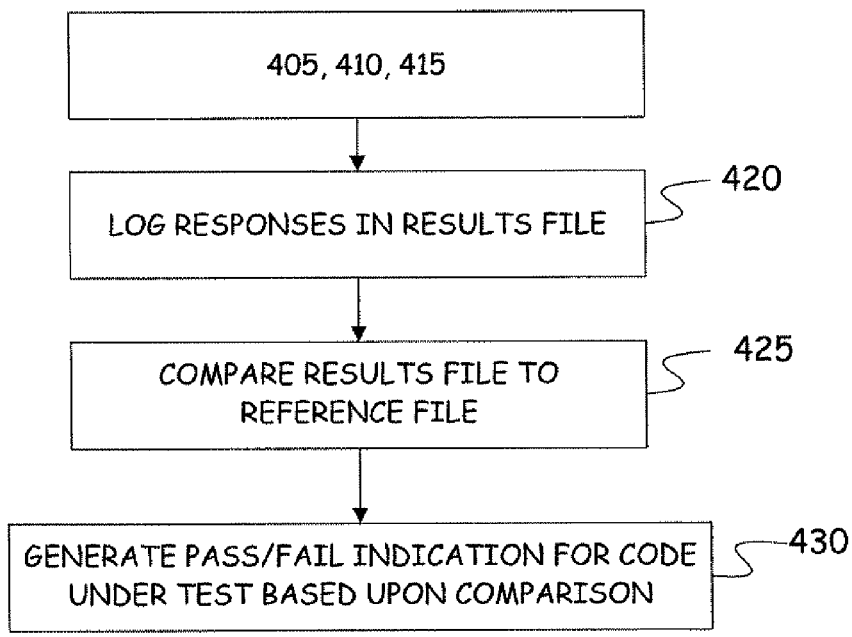

Referring now to FIG. 4-1, shown is an example of a method embodiment 400 of creating an extended test project 140 (FIG. 1) for validating code under test 125. As illustrated at step 405, the method includes calling a unit test 130 written by a developer for validating the code under test. The Unit Test Extender Engine 120 has a first function which is an identical mapping returning a single hard coded value to the code under test when called. Then, at step 410, the method is shown to include calling a test pattern 112 corresponding to the first function. The test pattern has a plurality of different values 114 which can be returned when the first function is called. Next, the method includes the step 415 of iteratively calling the first function and returning to the code under test during each iteration a different one of the plurality of different values in the test pattern in order to extend the unit test.

Referring now to FIG. 4-2, shown are additional steps of method 400 in some embodiments. As shown in FIG. 4-2, the method can also include the step 420 of logging responses of the code under test, to the return of each of the plurality of different values 114 in the test pattern, in a results file 150. Then, at step 425, the method can include comparing the results file to a reference file 160. At step 430, a pass/fail indication 170 is generated based upon the comparison of the results file to the reference file.

Figure 5:
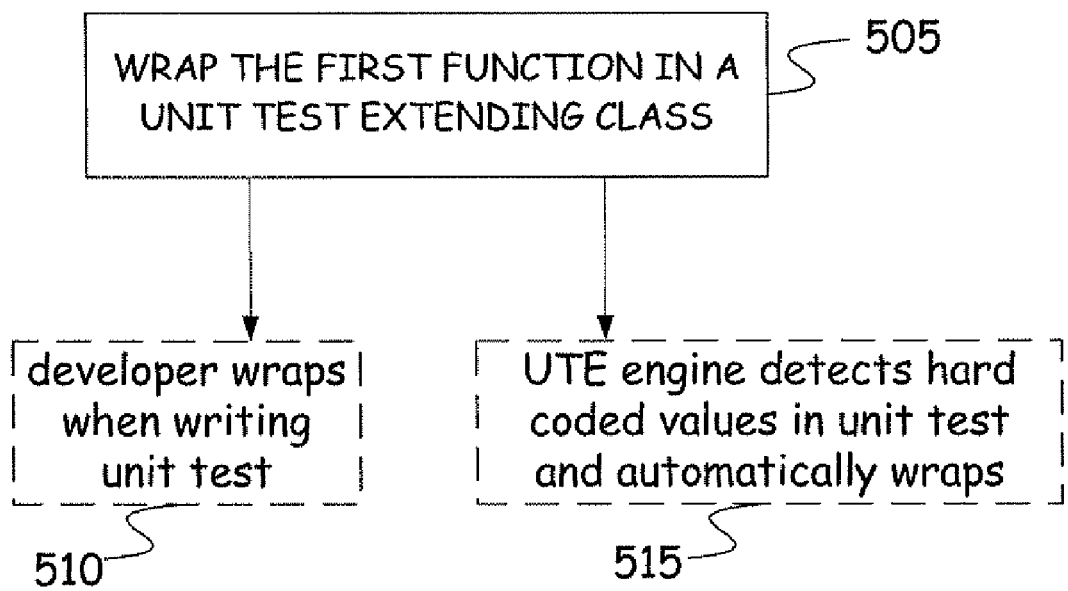
FIG. 5 is a flow diagram illustrating an additional step of a method embodiment.

Next, referring to FIG. 5, shown is an additional optional step 505 of wrapping the first function in a unit test extending class 212 to signify that the first function of the unit test should be extended using the test pattern. This step can be implemented in the form of step 510 in which the developer wraps the first function when writing the unit test, or in the form of step 515 in which the engine 120 does the wrapping automatically. Other method steps for alternate or more detailed embodiments can be as described above with reference to FIGS. 1, 2-1, 2-2 and 3.

Figure 6:
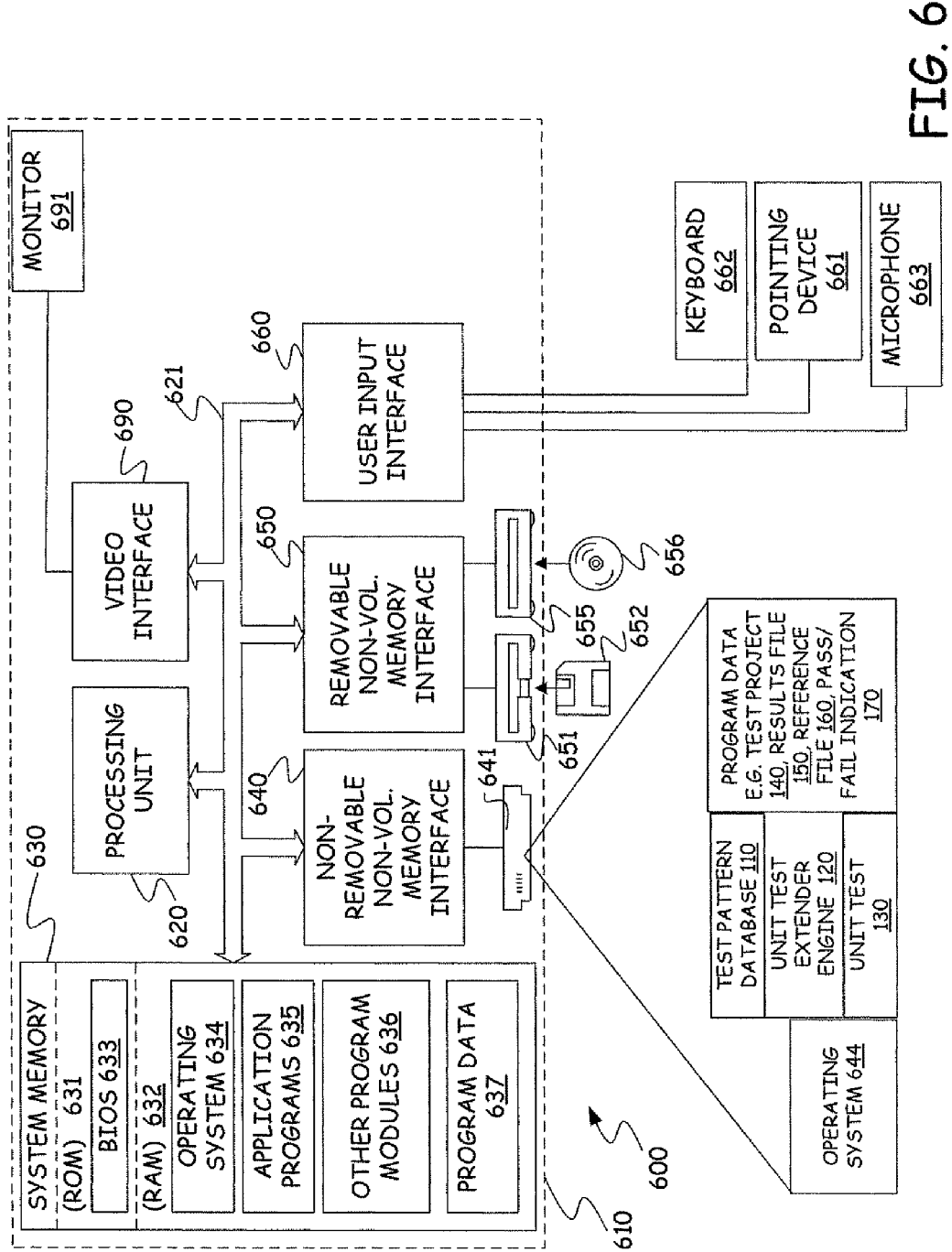
FIG. 6 is a block diagram illustrating an exemplary computing environment configured to implement the disclosed unit test extending system embodiments and/or the disclosed method embodiments.

FIG. 6 illustrates an example of a suitable computing system environment 600 on which the concepts herein described may be implemented. In particular, computing system environment 600 can be used to implement test pattern database 110, unit test extender engine 120 and unit test 130 as well as store, access and create data such as test project 140, results file 150, reference file 160 and pass/fail indication 170 as illustrated in FIG. 6 and discussed in an exemplary manner below. Nevertheless, the computing system environment 600 is again only one example of a suitable computing environment for each of these computers and is not intended to suggest any limitation as to the scope of use or functionality of the description below. Neither should the computing environment 600 be interpreted as having any dependency or requirement relating to any one or combination of components illustrated in the exemplary operating environment 600.

As shown in FIG. 6, an exemplary system includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter commands and information into the computer 610 through input devices such as a keyboard 662, and a pointing device 661, such as a mouse, trackball or touch pad. Other input devices (not shown) may include a scanner or the like. These and other input devices are often connected to the processing unit 620 through a user input interface 660 that is coupled to the system bus, but may be connected by other interface and bus structures, such as a parallel port or a universal serial bus (USB). A monitor 691 or other type of display device is also connected to the system bus 621 via an interface, such as a video interface 690.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A unit test extending system for use with a unit test written to validate code under test, the unit test having a first function configured to return a single hard coded value to the code under test, the unit test extending system comprising:

a computer storage medium having stored thereon the unit test and a test pattern database, the test pattern database including a plurality of test patterns for a plurality of different hard coded value data types; and a processing unit coupled to the computer storage medium, the processing unit being configured to provide a unit test extender engine which identifies a data type of the hard coded value of the first function in the unit test, retrieves one of the plurality of test patterns from the test pattern database stored on the computer storage medium based on the identified hard coded value data type, and automatically causes the processing unit to execute the first function in the unit test a plurality of times, each time returning a different one of a plurality of different values in the retrieved test pattern in order to automatically extend the unit test to allow the first function to test the code under test for responses to the plurality of different values in the retrieved test pattern in addition to the single hard coded value.

2. The unit test extending system of claim 1, wherein the first function in the unit test is wrapped in a unit test extending class.

3. The unit test extending system of claim 2, wherein the first function in the unit test is wrapped in the unit test extending class by wrapping the single hard coded value in the unit test extending class.

4. The unit test extending system of claim 3, wherein when wrapped in the unit test extending class, the first function specifies the single hard coded value and the data type of the single hard coded value.

5. The unit test extending system of claim 2, wherein the unit test extender engine is configured to automatically identify hard coded values in the unit test and to wrap corresponding functions in the unit test in the unit test extending class.

6. The unit text extending system of claim 5, wherein the unit test extender engine provided by the processing unit is configured to store the responses of the code under test to each of the plurality of different values in the retrieved test pattern in a results file on the computer storage medium, to compare the results file to a reference file stored on the computer storage medium, and to generate a pass/fail indication for the code under test based upon the comparison.

7. A unit test extending system for validating code under test, the unit test extending system comprising:
a computer storage medium having stored thereon a unit test and a test pattern database, the unit test configured to validate the code under test, the unit test having a first function configured to return a single hard coded value to the code under test when executed, the test pattern database including a plurality of test patterns for a plurality of different hard coded value data types;
a processing unit coupled to the computer storage medium, the processing unit configured to provide a unit test extender engine which identifies a data type of the hard coded value of the first function in the unit test, retrieves a corresponding test pattern from the test pattern database based on the identified hard coded value data type of the first function in the unit test, and automatically executes the first function in the unit test a plurality of times, each time iterating through the test pattern to return a different one of a plurality of different values in the retrieved test pattern in order to automatically extend the unit test to allow the first function to test the code under test for responses to each of the plurality of different values in the retrieved test pattern in addition to the single hard coded value.

8. The unit test extending system of claim 7, wherein the unit test is configured by a developer such that the single hard coded value returned to the code under test by the first function when executed is a correct value, and wherein each of the plurality of different values in the retrieved test pattern are incorrect values.

9. The unit test extending system of claim 7, wherein the first function in the unit test is wrapped in a unit test extending class.

10. The unit test extending system of claim 9, wherein the first function in the unit test is wrapped in the unit test extending class by wrapping the single hard coded value in the unit test extending class.

11. The unit test extending system of claim 9, wherein when wrapped in the unit test extending class, the first function specifies the single hard coded value and the data type of the single hard coded value.

12. The unit test extending system of claim 11, wherein the unit test is written by a developer such that the first function is wrapped in the unit test extending class.

13. The unit test extending system of claim 11, wherein the unit test extender engine is configured to identify hard coded values in the unit test and to automatically wrap corresponding functions in the unit test extending class.

14. A computer-implemented method of creating an extended test project for validating code under test, the method comprising:
storing a unit test written by a developer for validating the code under test on a computer storage medium, the unit test having a first function which is an identical mapping returning a single hard coded value to the code under test when executed;
executing the unit test using a processing unit coupled to the computer storage medium;
retrieving, using the processing unit, a test pattern corresponding to the first function, the test pattern having a plurality of different values which can be returned when the first function is executed; and
iteratively executing, using the processing unit, the first function and returning to the code under test during each iteration a different one of the plurality of different values in the test pattern in order to extend the unit test.

15. The computer-implemented method of claim 14, and further comprising:
using the processing unit to store responses of the code under test, to the return of each of the plurality of different values in the test pattern, in a results file on the computer storage medium;
using the processing unit to compare the results file to a reference file stored on the computer storage medium; and
using the processing unit to generate a pass/fail indication for the code under test based upon the comparison of the results file to the reference file.

16. The computer-implemented method of claim 15, and further comprising wrapping the first function in a unit test extending class to signify that the first function of the unit test should be extended using the test pattern.

17. The computer-implemented method of claim 16, wherein wrapping the first function in the unit test extending class further comprises writing the unit test such that the first function is wrapped in the unit test extending class.

18. The computer-implemented method of claim 16, wherein wrapping the first function in the unit test extending class further comprises detecting the single hard coded value in the unit test and automatically wrapping the first function in the unit test extending class.

19. The computer-implemented method of claim 15, wherein retrieving the test pattern corresponding to the first function further comprises retrieving the test pattern from a database of test patterns stored on the computer storage medium, the test patterns in the database corresponding to particular hard coded value data types, and can be used by any test unit having the particular hard coded value data types, based upon the data type of the single hard coded value of the first function.

20. The computer-implemented method of claim 15, wherein iteratively executing the first function and returning to the code under test during each iteration a different one of the plurality of different values in the test pattern further comprises iteratively executing the first function until an indication of no further patterns is returned from the test pattern.

* * * * *